(12) United States Patent
Lindsay et al.

(10) Patent No.: US 10,647,226 B2
(45) Date of Patent: May 12, 2020

(54) VEHICLE SEAT AND METHOD OF ASSEMBLING

(71) Applicant: Honda Motor Co., Ltd., Tokyo (JP)

(72) Inventors: Derek S. Lindsay, Marysville, OH (US); Michael J. Wilms, Marysville, OH (US); Satoshi Hayashi, Dublin, OH (US); Sonatkumar Patel, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 16/052,362

(22) Filed: Aug. 1, 2018

(65) Prior Publication Data

US 2020/0039393 A1 Feb. 6, 2020

(51) Int. Cl.
*B60N 2/20* (2006.01)
*B60N 2/22* (2006.01)
*B60N 2/30* (2006.01)
*B60R 22/26* (2006.01)
*B60N 2/90* (2018.01)

(52) U.S. Cl.
CPC ........... *B60N 2/2236* (2013.01); *B60N 2/206* (2013.01); *B60N 2/2227* (2013.01); *B60N 2/3009* (2013.01); *B60N 2/938* (2018.02); *B60R 22/26* (2013.01)

(58) Field of Classification Search
CPC ...... B60N 2/028; B60N 2/206; B60N 2/2227; B60N 2/2236; B60N 2/304; B60N 2/3045; B60N 2/938; B60N 2/20; B60N 2/22; B60N 2/3004; B60N 2/3009; B60N 2/3011; B60R 22/26; B64D 11/0619; B64D 11/064

See application file for complete search history.

(56) References Cited

U.S. PATENT DOCUMENTS

| 5,176,356 A * | 1/1993 | Lorbiecki | ............... B60N 2/504 248/157 |
| 5,722,722 A | 3/1998 | Massara | |
| 5,772,280 A * | 6/1998 | Massara | ............... B60N 2/2222 297/216.12 |
| 6,375,255 B1 | 4/2002 | Maruta et al. | |

(Continued)

FOREIGN PATENT DOCUMENTS

| CA | 2286048 A1 * | 10/1998 | ............... B60N 2/20 |
| DE | 102007032524 A1 | 1/2009 | |

(Continued)

*Primary Examiner* — Ryan D Kwiecinski
(74) *Attorney, Agent, or Firm* — Armstrong Teasdale LLP (57) ABSTRACT

A vehicle seat including a seat bottom, a seat back rotatable relative to the seat bottom, and a damper assembly. The assembly includes a bracket coupled between the seat bottom and the seat back, and a cam plate coupled to the bracket and to the seat back. The cam plate is rotatable relative to the bracket and in a fixed orientation relative to the seat back such that the cam plate is rotatable with the seat back relative to the seat bottom. The cam plate includes an arcuate slot. The assembly also includes a linear damper including a first end coupled to the bracket and a second end coupled within the arcuate slot. The second end is translatable within the arcuate slot such that the linear damper is configured to provide selective damping to the seat back based on an orientation of the seat back relative to the seat bottom.

19 Claims, 6 Drawing Sheets

(56) References Cited

U.S. PATENT DOCUMENTS

| | | | |
|---|---|---|---|
| 6,601,915 B2* | 8/2003 | Sullivan | B60N 2/0232 297/216.1 |
| 6,739,668 B2* | 5/2004 | Coman | B60N 2/206 297/378.12 |
| 7,246,836 B2 | 7/2007 | Hahn | |
| 7,252,320 B2 | 8/2007 | Tsujibayashi et al. | |
| 7,344,195 B2 | 3/2008 | Folkert et al. | |
| 7,390,062 B2 | 6/2008 | Hahn | |
| 8,833,833 B2 | 9/2014 | Jeong et al. | |
| 9,114,736 B2* | 8/2015 | Ngiau | B60N 2/12 |
| 9,126,508 B2 | 9/2015 | Line et al. | |
| 9,308,840 B2* | 4/2016 | Stesl | B60N 2/36 |
| 9,849,989 B2 | 12/2017 | Ozaki et al. | |
| 2008/0252129 A1 | 10/2008 | Nathan et al. | |
| 2009/0001786 A1* | 1/2009 | Haglund | B60N 2/0232 297/216.14 |
| 2010/0201167 A1 | 8/2010 | Wieclawski | |
| 2012/0181842 A1* | 7/2012 | Gleason | B60N 2/433 297/463.1 |
| 2018/0015849 A1 | 1/2018 | Mahadik et al. | |

FOREIGN PATENT DOCUMENTS

| | | | | |
|---|---|---|---|---|
| EP | 3434512 A1 * | 1/2019 | | B64D 11/064 |
| FR | 2896196 A1 * | 7/2007 | | B60N 2/206 |
| FR | 2916698 A1 * | 12/2008 | | B60N 2/206 |
| JP | 2000280805 A | 10/2000 | | |
| JP | 4320595 B2 | 8/2009 | | |
| WO | WO-2006099937 A1 * | 9/2006 | | B60N 2/06 |
| WO | WO-2008035804 A1 * | 3/2008 | | B60N 2/20 |
| WO | 2017062153 A1 | 4/2017 | | |

\* cited by examiner

VEHICLE SEAT AND METHOD OF ASSEMBLING

BACKGROUND

The field of the present disclosure relates generally to vehicle seats and, more specifically, to vehicle seats designed to fold within a vehicle.

Modern motor vehicles include seat belt devices that facilitate restraining passengers within a passenger compartment of the vehicle. At least some known reclinable vehicle seats have a standalone seat belt system integrated therewith. The standalone seat belt system is integrated within a seat back of the vehicle seat rather than being attached to a separate structure in the passenger compartment. Integrated seat belt systems enable the vehicle seat to be moved within the passenger compartment of the vehicle such that a shoulder belt will still be capable of extending around the passenger after the seat is moved. However, integrating the seat belt system with the seat back increases the weight of the seat back, which generally requires a heavier torsion spring to be installed in a seat recline assembly of the vehicle seat to enable forward rotation of the seat back when a recliner lever on the vehicle seat is activated. The torsion spring facilitates actuating forward rotation of the seat back from a reclined position to an upright position, and also from the upright position to a folded flat position. However, the increased weight of the seat back and the increased rotational force induced by the heavier torsion spring can be a hazard if forward rotation of the seat back is unhindered.

BRIEF DESCRIPTION

In one aspect, a vehicle seat is provided. The vehicle seat includes a seat bottom, a seat back selectively rotatable relative to the seat bottom, and a damper assembly. The assembly includes a bracket coupled between the seat bottom and the seat back, and a cam plate coupled to the bracket and to the seat back. The cam plate is rotatable relative to the bracket and is mounted in a fixed orientation relative to the seat back such that the cam plate is rotatable with the seat back relative to the seat bottom. The cam plate includes an arcuate slot. The assembly also includes a linear damper including a first end coupled to the bracket and a second end coupled within the arcuate slot. The second end is translatable within the arcuate slot to facilitate selective rotational damping of the seat back relative to the seat bottom.

In another aspect, a vehicle seat is provided. The vehicle seat includes a seat bottom, a seat back selectively rotatable relative to the seat bottom, and a damper assembly including a plate coupled to the seat back. The plate is mounted in a fixed orientation relative to the seat back such that the plate is rotatable with the seat back relative to the seat bottom. The plate includes an arcuate slot. The damper assembly further includes a damper including an end translatable within the arcuate slot to facilitate selective rotational damping of the seat back relative to the seat bottom.

In yet another aspect, a method of assembling a vehicle seat is provided. The method includes coupling a bracket between a seat bottom and a seat back such that the seat back is selectively rotatable relative to the seat bottom, and coupling a cam plate to the bracket and to the seat back. The cam plate is rotatable relative to the bracket and is mounted in a fixed orientation relative to the seat back such that the cam plate is rotatable with the seat back relative to the seat bottom. The cam plate includes an arcuate slot. The method also includes coupling a linear damper between the bracket and the cam plate, the linear damper including a first end coupled to the bracket and a second end coupled within the arcuate slot, the second end translatable within the arcuate slot to facilitate selective rotational damping of the seat back relative to the seat bottom.

DETAILED DESCRIPTION

The embodiments described herein relate generally to an assembly for use in controlling the folding speed of a vehicle seat. More specifically, the assembly described herein includes a bracket, a cam plate, and a linear damper coupled therebetween. The bracket is coupled between a seat bottom and a seat back of the vehicle seat, and the bracket enables the seat back to be selectively rotatable relative to the seat bottom. The cam plate is mounted in a fixed orientation relative to the seat back such that the cam plate is rotatable with the seat back, and such that the cam plate facilitates actuating the linear damper when the seat back is rotated in different ranges of motion. For example, the linear damper is extended when the seat back is rotated towards a reclined position, and is retracted when the seat back is rotated towards a fully folded position. Retracting the linear damper facilitates counteracting a rotational force provided by a torsion spring in the vehicle seat such that the folding speed of the seat back is reduced. As such, the assembly described herein provides selective rotational damping to the vehicle seat in a space-saving manner that facilitates maintaining passenger comfort, while remaining easily packaged in the design footprint space allotted for the vehicle seat.

Figure 1:
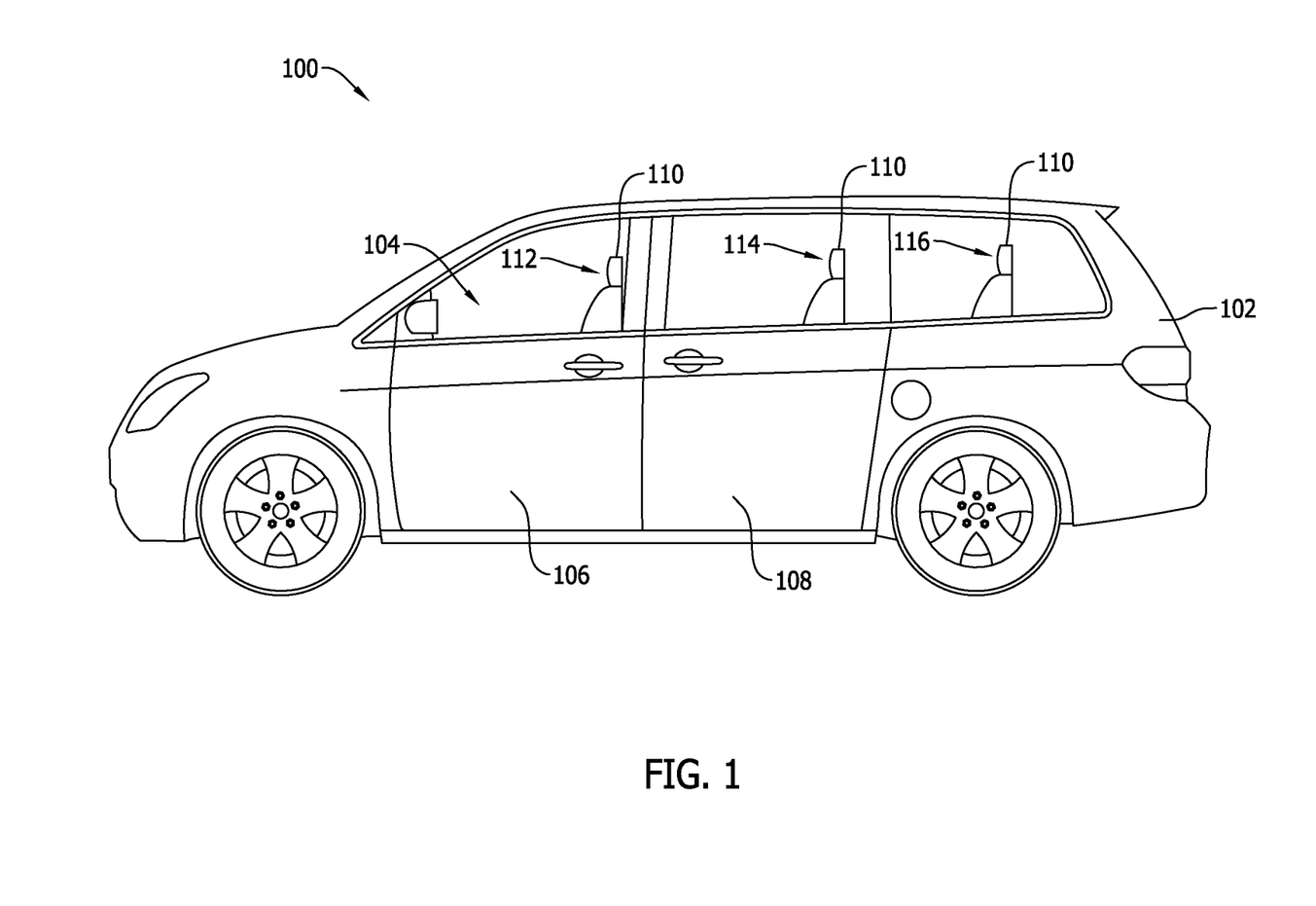
FIG. 1 is side view illustration of an exemplary vehicle.

FIG. 1 is side view illustration of an exemplary vehicle 100. In the exemplary embodiment, vehicle 100 includes a body 102 that defines a passenger compartment 104. Body 102 includes a front door 106 and a rear sliding door 108 that provide access to passenger compartment 104. In addition, vehicle 100 includes a plurality of vehicle seats 110 positioned within passenger compartment 104. Vehicle seats 110 are arranged in rows, such as a front row 112, a second row 114, and a third row 116. As will be explained in more detail below, vehicle seats 110 in second row 114 and third row 116 are foldable to facilitate increasing a cargo capacity within passenger compartment 104. In FIG. 1, vehicle 100 is illustrated as being a minivan. Alternatively, vehicle 100 may be any vehicle having multiple rows of vehicle seats 110 including, but not limited to, sport utility vehicles.

Figure 2:
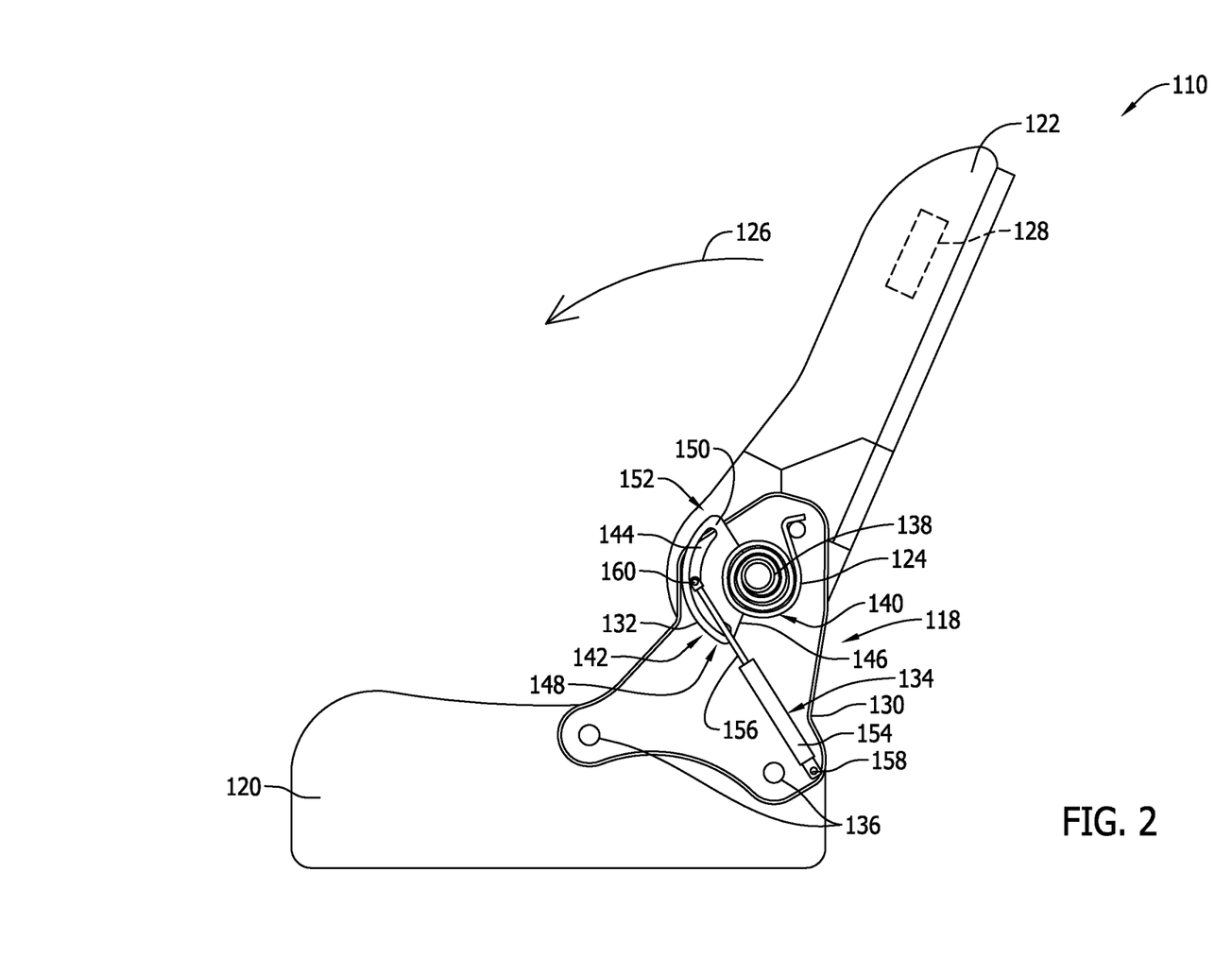
FIG. 2 is a side view illustration of an exemplary vehicle seat that may be used in the vehicle shown in FIG. 1.
Figure 3:
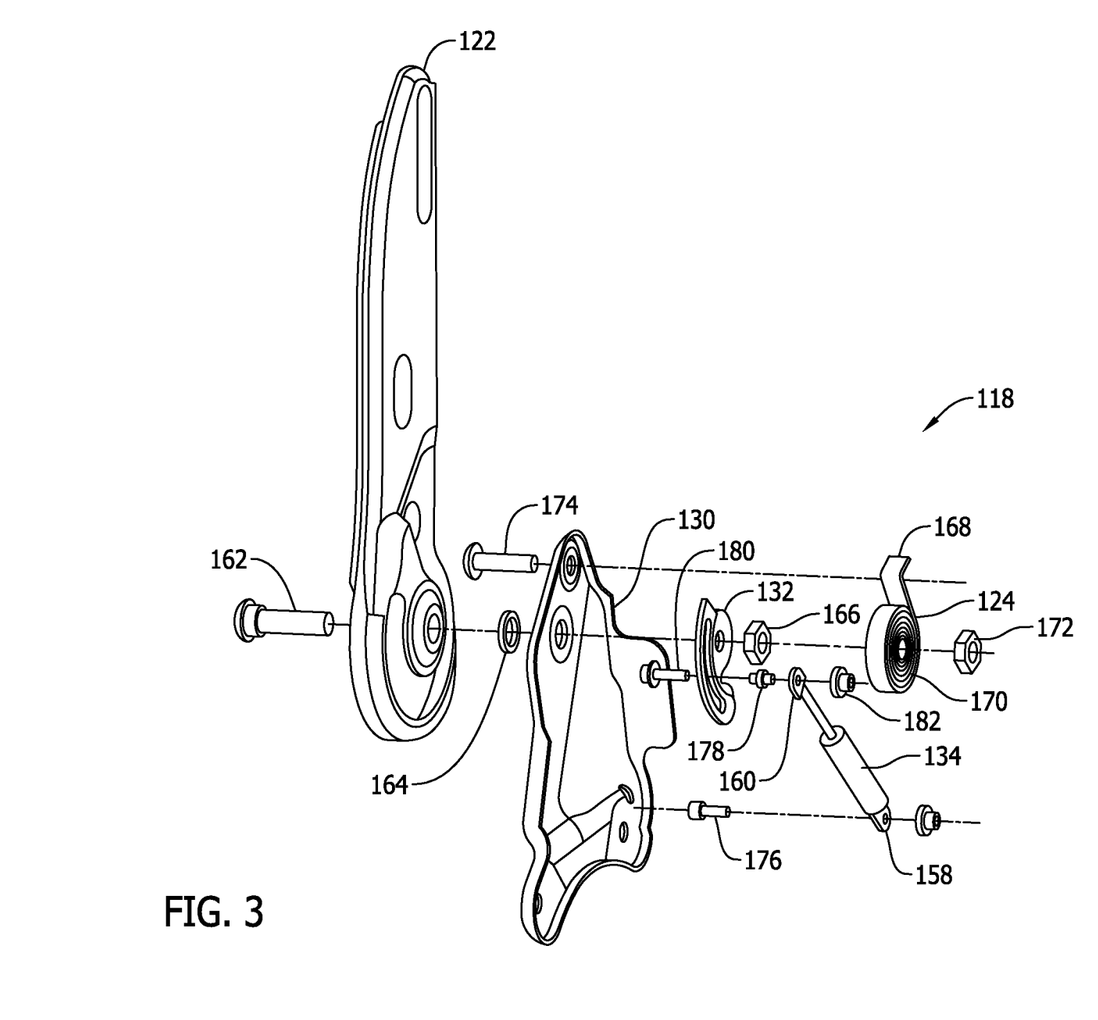
FIG. 3 is an exploded view of an exemplary damper assembly that may be used with the vehicle seat shown in FIG. 2.

FIG. 2 is a side view illustration of vehicle seat 110 that may be used in vehicle 100 (shown in FIG. 1), and FIG. 3 is an exploded view of a damper assembly 118 that may be used with vehicle seat 110. In the exemplary embodiment, vehicle seat 110 includes a seat bottom 120 and a seat back 122 rotatable relative to seat bottom 120. Vehicle seat 110 also includes a torsion spring 124 and damper assembly 118. Torsion spring 124 enables selective rotation of seat back 122 in a forward direction 126, and damper assembly 118 facilitates controlling a rotational folding speed of seat back 122 in forward direction 126 relative to seat bottom 120. Seat back 122 includes a seat belt system 128 integrated therewith. Seat belt system 128 is self-contained in that seat belt system 128 is fully functional without requiring it to be coupled to a structural member within passenger compartment 104 (shown in FIG. 1).

Damper assembly 118 includes a bracket 130, a cam plate 132, and a linear damper 134. Bracket 130 is coupled between seat bottom 120 and seat back 122 in a manner that enables seat back 122 to selectively rotate relative to seat bottom 120. For example, bracket 130 is coupled to seat bottom 120 at a pair of mounting points 136, and is coupled to seat back 122 at a single mounting point 138. Cam plate 132 includes an inner radial portion 140 and an outer radial portion 142 having an arcuate profile. Outer radial portion 142 includes an arcuate slot 144 defined therein. Arcuate slot 144 defines a first stopper 146 at a first end 148 of outer radial portion 142, and defines a second stopper 150 at a second end 152 of outer radial portion 142. Outer radial portion 142 extends less than a full circumference about inner radial portion 140. In one embodiment, outer radial portion 142 extends less than 180°, or less than about 120°, about inner radial portion 140. Cam plate 132 is oriented, relative to seat back 122, to enable first stopper 146 and second stopper 150 to actuate linear damper 134 when seat back 122 and cam plate 132 are rotated relative to seat bottom 120.

In the exemplary embodiment, linear damper 134 includes a cylinder 154 and a piston 156 translatable relative to cylinder 154. In one embodiment, linear damper 134 is a gas-oil linear actuator in which cylinder 154 contains a working fluid including a combination of oil and gas. The oil facilitates wetting a seal (not shown) defined between cylinder 154 and piston 156, and the gas facilitates hindering retraction of piston 156 within cylinder 154 such that the rotational speed of seat back 122 is controlled.

Linear damper 134 is oriented obliquely relative to seat bottom 120. In one embodiment, linear damper 134 is mounted in a fixed orientation relative to seat bottom 120. For example, linear damper 134 includes a first end 158 coupled to bracket 130, and first end 158 is coupled to bracket 130 in a manner that precludes rotation of linear damper 134 relative to bracket 130. In addition, linear damper 134 includes a second end 160 coupled within arcuate slot 144. Second end 160 is selectively translatable within arcuate slot 144 such that linear damper 134 provides selective damping to seat back 122 based on an orientation of seat back 122 relative to seat bottom 120, as described in more detail below. In the exemplary embodiment, linear damper 134 is oriented such that cylinder 154 is coupled to bracket 130 and piston 156 is coupled within arcuate slot 144. Alternatively, linear damper 134 is inverted such that piston 156 is coupled to bracket 130 and cylinder 154 is coupled within arcuate slot 144, which facilitates wetting the seal defined between cylinder 154 and piston 156 with the oil contained within cylinder 154.

Referring to FIG. 3, damper assembly 118 is arranged such that cam plate 132 is positioned outboard of bracket 130, relative to a center of vehicle seat 110 (shown in FIG. 2), such that linear damper 134 is positioned outboard of cam plate 132 and bracket 130, and such that torsion spring 124 is positioned outboard of cam plate 132. In the exemplary embodiment, cam plate 132 is selectively rotatable relative to bracket 130, and is in a fixed orientation relative to seat back 122. Thus, bracket 130 and cam plate 132 are coupled to seat back 122 with a pivot pin 162. For example, a bushing 164 is positioned between seat back 122 and bracket 130, and pivot pin 162 is insertable through seat back 122, bushing 164, bracket 130, and cam plate 132. Cam plate 132 is then coupled to pivot pin 162 with a nut 166, which facilitates securing cam plate 132 in the fixed orientation relative to seat back 122.

In the exemplary embodiment, torsion spring 124 includes a free end 168 and a coiled portion 170. Pivot pin 162 is further inserted through nut 166, through coiled portion 170, and torsion spring 124 is secured to pivot pin 162 with a nut 172. Torsion spring 124 is also coupled to bracket 130. For example, a mounting pin 174 is inserted through bracket 130 and is then coupled to free end 168 of torsion spring 124.

As noted above, first end 158 of linear damper 134 is coupled to bracket 130. In one embodiment, first end 158 is coupled to bracket 130 with a fastener 176, such as a weld stud, such that linear damper 134 is mounted in a fixed orientation relative to bracket 130. As noted above, second end 160 of linear damper 134 is translatable within arcuate slot 144. In one embodiment, a bushing 178 is positioned between cam plate 132 and second end 160 of linear damper 134. A bolt 180 is insertable through arcuate slot 144, bushing 178, and second end 160, and bolt 180 is then secured to second end 160 with a nut 182.

Figure 4:
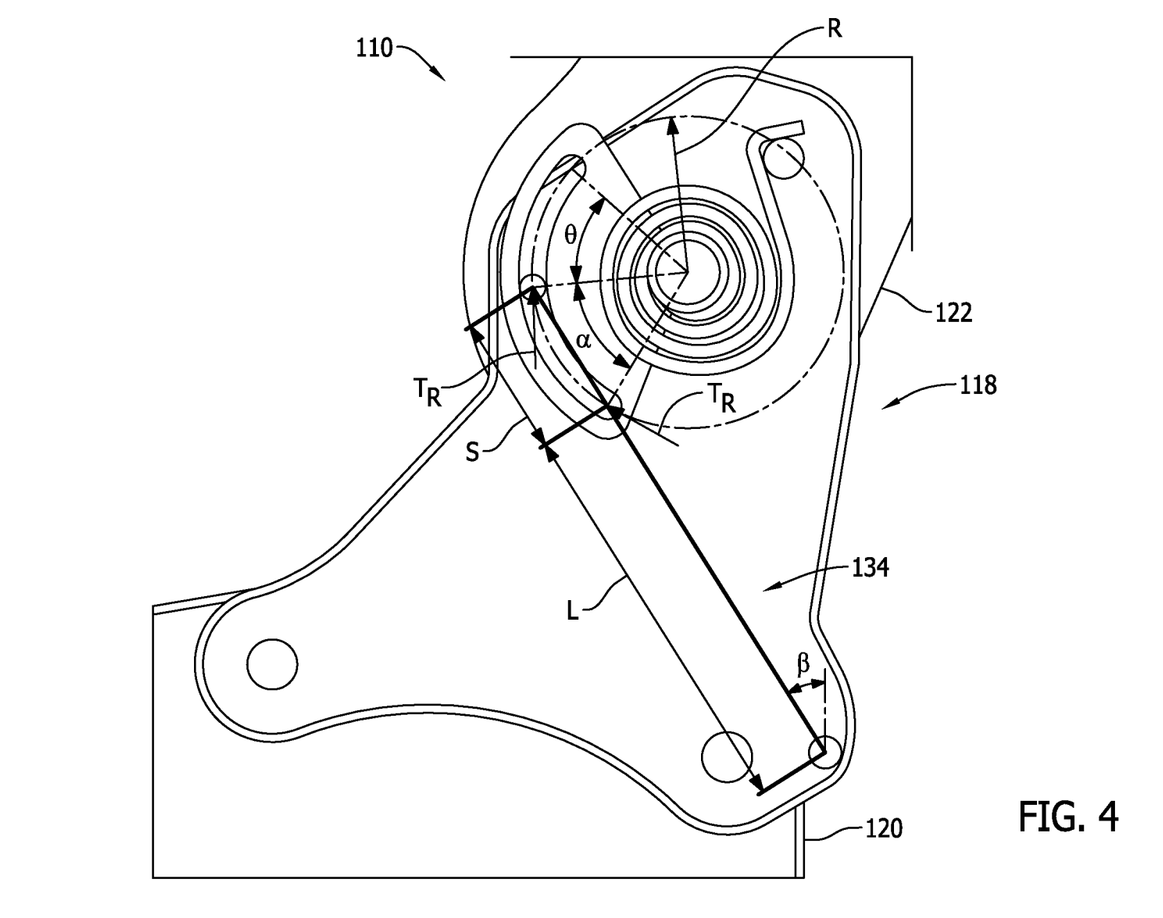
FIG. 4 is a partially transparent schematic illustration of the vehicle seat shown in FIG. 2.

FIG. 4 is a partially transparent schematic illustration of vehicle seat 110. FIG. 4 illustrates a plurality of design parameters for damper assembly 118 that were selected to achieve a target folding speed for seat back 122 that is less than a predetermined threshold of about 4 meters per second. Example design parameters include a damper compressed length L, a damper stroke length S, a damper actuation delay $\theta$, a damper engagement a, an arcuate slot radius R, a damper orientation angle $\beta$, and a damper reaction torque vector $T_R$. If damper compressed length L and a damper stroke length S are held constant, based on the size of linear damper 134 that can be packaged in the limited space constraints imposed on the design of vehicle seat 110, the other design parameters may be adjusted in a manner that would result in generating damper reaction torque vector $T_R$ that would meet or exceed the target folding speed.

For example, the damper actuation delay $\theta$ is defined within a range between about 20° and about 70°, between about 30° and about 60°, between about 30° and about 50°, or is about 45°. The damper engagement a is defined within a range between about 20° and about 70°, between about 30° and about 60°, between about 30° and about 50°, or is about 53°. The arcuate slot radius R is defined within a range between about 30 millimeters (mm) and about 60 mm, between about 30 mm and about 50 mm, between about 35 mm and about 45 mm, or is about 41.5 mm. The damper orientation angle $\beta$ is defined within a range between about 0° and about 45°, between about 15° and about 45°, between about 30° and about 40°, or is about 32.5°.

Figure 5:
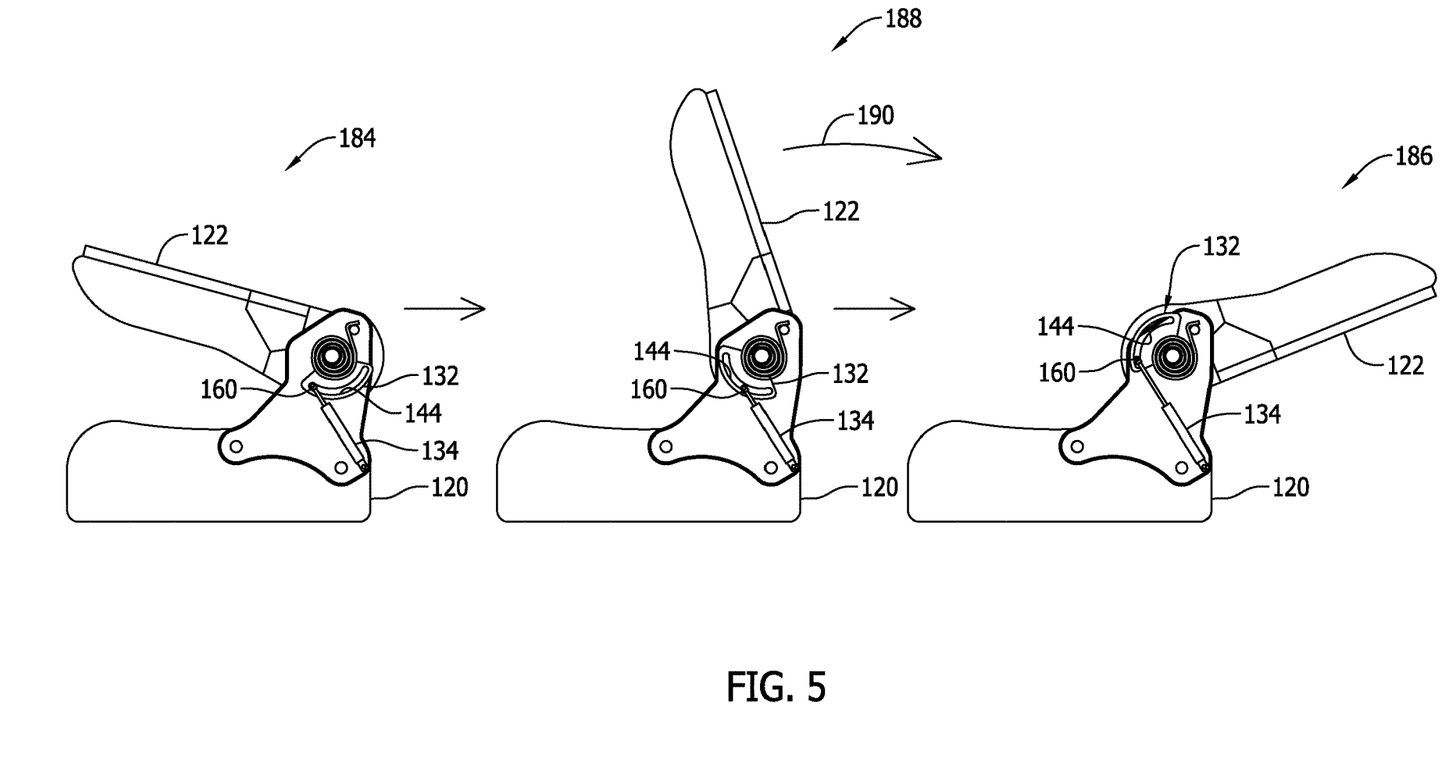
FIG. 5 is an illustration depicting an exemplary first directional range of motion for the vehicle seat shown in FIG. 2.

FIG. 5 is an illustration depicting a first directional range of motion for vehicle seat 110. In the exemplary embodiment, seat back 122 is selectively rotatable from a fully folded position 184 towards a reclined position 186, and from reclined position 186 towards fully folded position 184. Thus, seat back 122 is positionable in a first partially folded position 188, which is a position intermediate between fully folded position 184 and reclined position 186. Linear damper 134 is configured to be extended when seat back 122 is rotated in the first directional range of motion, which is defined between first partially folded position 188 and reclined position 186 when seat back 122 is rotated in a first direction 190 from first partially folded position 188 towards reclined position 186. For example, as noted above, cam plate 132 is in a fixed orientation relative to seat back 122, and cam plate 132 facilitates actuating linear damper 134 based on the orientation of seat back 122 relative to seat bottom 120. When seat back 122 is rotated in first direction 190 from fully folded position 184 towards first partially folded position 188, arcuate slot 144 is oriented to enable second end 160 of linear damper 134 to travel therein such that linear damper 134 remains in a retracted state. When vehicle seat 110 is at first partially folded position 188, first end 158 and first stopper 146 are positioned for engagement with each other. Thus, when seat back 122 is rotated in first direction 190 from first partially folded position 188 towards reclined position 186, first stopper 146 extends linear damper 134.

Figure 6:
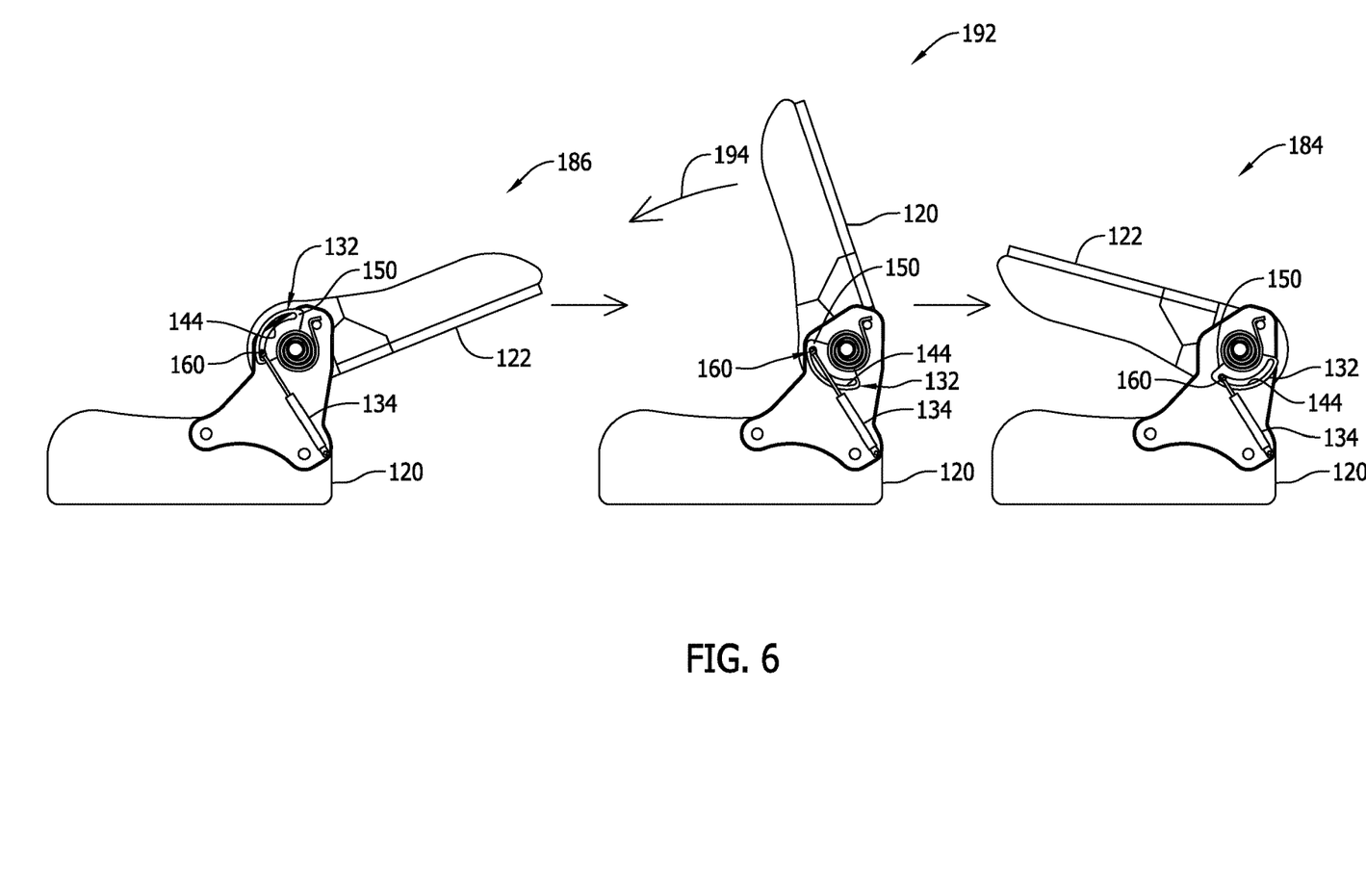
FIG. 6 is an illustration depicting an exemplary second directional range of motion for the vehicle seat shown in FIG. 2.

FIG. 6 is an illustration depicting a second directional range of motion for vehicle seat 110. In the exemplary embodiment, seat back 122 is positionable in a second partially folded position 192 that is a position intermediate between reclined position 186 and fully folded position 184. Linear damper 134 is configured to be retracted when seat back 122 is rotated in the second directional range of motion, which is defined between second partially folded position 192 and fully folded position 184 when seat back 122 is rotated in a second direction 194 from second partially folded position 192 towards fully folded position 184. When seat back 122 is rotated in second direction 194 from reclined position 186 towards second partially folded position 192, arcuate slot 144 oriented to enable first end 158 of linear damper 134 to travel therein such that linear damper 134 remains in an extended state. When vehicle seat 110 is at second partially folded position 192, first end 158 and second stopper 150 are positioned for engagement with each other. Thus, when seat back 122 is rotated in second direction 194 from second partially folded position 192 towards fully folded position 184 (e.g., as a result of a rotational force provided by torsion spring 124), second stopper 150 actuates linear damper 134 towards the retracted state. As such, linear damper 134 facilitates providing rotational damping to seat back 122 when rotated in the second directional range of motion.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle seat comprising:
   a seat bottom;
   a seat back selectively rotatable relative to said seat bottom; and
   a damper assembly comprising:
      a bracket coupled between said seat bottom and said seat back;
      a cam plate coupled to said bracket and to said seat back, said cam plate rotatable relative to said bracket and mounted in a fixed orientation relative to said seat back such that said cam plate is rotatable with said seat back relative to said seat bottom, said cam plate comprising an arcuate slot; and
      a linear damper comprising a first end coupled to said bracket and a second end coupled within said arcuate slot, said second end translatable within said arcuate slot to facilitate selective rotational damping of said seat back relative to said seat bottom.

2. The vehicle seat in accordance with claim 1, wherein said linear damper is configured to be extended when said seat back is rotated in a first directional range of motion, and is configured to be retracted when said seat back is rotated in a second directional range of motion opposite from the first directional range of motion.

3. The vehicle seat in accordance with claim 2, wherein said cam plate is oriented relative to said seat back such that the first directional range of motion is defined between a first partially folded position and a reclined position of said seat back, and such that the second directional range of motion is defined between a second partially folded position and a fully folded position of said seat back.

4. The vehicle seat in accordance with claim 2, wherein said arcuate slot defines a first stopper at a first end of said cam plate and a second stopper at a second end of said cam plate, said first stopper configured to extend said linear damper and said second stopper configured to retract said linear damper.

5. The vehicle seat in accordance with claim 1, wherein said linear damper comprises a cylinder and a piston translatable relative to said cylinder, said cylinder coupled to said cam plate and said piston coupled to said bracket.

6. The vehicle seat in accordance with claim 5, wherein said cylinder contains a working fluid comprising a combination of oil and gas.

7. The vehicle seat in accordance with claim 1, wherein said linear damper is oriented obliquely relative to said seat bottom.

8. The vehicle seat in accordance with claim 1, wherein said seat back comprises a self-contained seat belt system integrated therewith.

9. The vehicle seat in accordance with claim 1, wherein said damper assembly is configured to achieve a target folding speed for said seat back of less than about 4 meters per second.

10. A vehicle seat comprising:
    a seat bottom;
    a seat back selectively rotatable relative to said seat bottom; and
    a damper assembly comprising:
       a plate coupled to said seat back, said plate mounted in a fixed orientation relative to said seat back such that said plate is rotatable with said seat back relative to said seat bottom, said plate comprising an arcuate slot; and
       a damper comprising an end translatable within said arcuate slot to facilitate selective rotational damping of said seat back relative to said seat bottom, wherein said damper comprises a cylinder and a piston translatable relative to said cylinder.

11. The vehicle seat in accordance with claim 10, wherein said damper is configured to be extended when said seat back is rotated in a first directional range of motion, and is configured to be retracted when said seat back is rotated in a second directional range of motion opposite from the first directional range of motion.

12. The vehicle seat in accordance with claim 11, wherein said plate is oriented relative to said seat back such that the first directional range of motion is defined between a first partially folded position and a reclined position of said seat back, and such that the second directional range of motion is defined between a second partially folded position and a fully folded position of said seat back.

13. The vehicle seat in accordance with claim 11, wherein said arcuate slot defines a first stopper at a first end of said plate and a second stopper at a second end of said plate, said first stopper configured to extend said damper and said second stopper configured to retract said damper.

14. The vehicle seat in accordance with claim 10, wherein said cylinder contains a working fluid comprising a combination of oil and gas.

15. The vehicle seat in accordance with claim 10, wherein said damper is oriented obliquely relative to said seat bottom.

16. The vehicle seat in accordance with claim 10, wherein said seat back comprises a self-contained seat belt system integrated therewith.

17. The vehicle seat in accordance with claim 10, wherein said damper assembly is configured to achieve a target folding speed for said seat back of less than about 4 meters per second.

18. A method of assembling a vehicle seat comprising:
coupling a bracket between a seat bottom and a seat back such that the seat back is selectively rotatable relative to the seat bottom;
coupling a cam plate to the bracket and to the seat back, the cam plate rotatable relative to the bracket and mounted in a fixed orientation relative to the seat back such that the cam plate is rotatable with the seat back relative to the seat bottom, the cam plate including an arcuate slot; and
coupling a linear damper between the bracket and the cam plate, the linear damper including a first end coupled to the bracket and a second end coupled within the arcuate slot, the second end translatable within the arcuate slot to facilitate selective rotational damping of the seat back relative to the seat bottom.

19. The method in accordance with claim 18 further comprising coupling a torsion spring to the bracket and to the cam plate, the cam plate positioned outboard of the bracket, the linear damper positioned outboard of the cam plate, and the torsion spring positioned outboard of the cam plate.

* * * * *